United States Patent [19]

Burness et al.

[11] E Re. 29,305

[45] Reissued July 12, 1977

[54] HYDROPHILIC-COLLOID SILVER HALIDE EMULSION HARDENED WITH A BISVINYLSULFONYL COMPOUND

[75] Inventors: Donald M. Burness; Robert A. Silverman, both of Rochester, N.Y.

[73] Assignee: Eastman Kodak Company, Rochester, N.Y.

[21] Appl. No.: 732,572

[22] Filed: Oct. 15, 1976

Related U.S. Patent Documents

Reissue of:

[64] Patent No.: 3,841,872
Issued: Oct. 15, 1974
Appl. No.: 293,698
Filed: Sept. 29, 1972

[51] Int. Cl.[2] ..... G03C 1/30

[52] U.S. Cl. ..... 96/67; 96/111; 260/607 A; 260/117; 106/125

[58] Field of Search ..... 96/111, 67; 260/607 A, 260/117; 106/125

[56] References Cited

U.S. PATENT DOCUMENTS

| | | | |
|---|---|---|---|
| 3,392,024 | 7/1968 | Burness | 96/111 |
| 3,642,486 | 2/1972 | Burness et al. | 96/111 |
| 3,642,908 | 2/1972 | Burness et al. | 96/111 |
| 3,676,143 | 7/1972 | Himmelmann et al. | 96/111 |

*Primary Examiner*—Won H. Louie, Jr.
*Attorney, Agent, or Firm*—J. J. Ruch

[57] ABSTRACT

Photographic elements are disclosed containing a hydrophilic colloid layer hardened with a compound having two vinylsulfonyl radicals coupled through a divalent hydrocarbon radical chosen from the group consisting of (1) an aliphatic radical having from 1 to 6 carbon atoms, (2) —X—Y—X— in which X is an alkylene group having 1 or 2 carbon atoms and Y is a phenylene group and (3) a phenyl-substituted methylene group. The compounds may be utilized generally in hardenable hydrophilic colloid compositions. Except for those compounds incorporating an alkylene divalent hydrocarbon radical, the hardeners are new compounds.

11 Claims, No Drawings

HYDROPHILIC-COLLOID SILVER HALIDE EMULSION HARDENED WITH A BISVINYLSULFONYL COMPOUND

Matter enclosed in heavy brackets [ ] appears in the original patent but forms no part of this reissue specification; matter printed in italics indicates the additions made by reissue.

*This application is a reissue application for U.S. Pat. No. 3,841,872, based on U.S. Ser. No. 293,698, filed Sept. 29, 1972, by Donald M. Burness and Robert A. Silverman.*

This invention relates to hydrophilic colloid compositions and to photographic elements containing at least one hydrophilic colloid layer hardened with a compound having two vinylsulfonyl radicals linked by a divalent hydrocarbon radical containing an aliphatic linking moiety. Additionally, this invention relates to novel compounds of this type useful as hardeners.

In the photographic arts, hydrophilic colloids—typically refined gelatins—have been used to suspend silver halide grains and thereby to form radiation-sensitive compositions which when coated onto suitable supports are capable of forming photographic elements. Typically, a variety of addenda is employed to alter the properties of both the gelatin and the silver halide grains. It has been recognized previously in the art that, without special modifiers, hydrophilic colloids such as gelatins ingest large quantities of water when brought into contact with aqueous solutions, causing appreciable swelling, and are easily abraded. Also, unmodified gelatin coatings tend to melt at relatively low temperatures, thereby limiting their temperature range of utility. To alter these deficiencies of unmodified photographic gelatins, it has heretofore been recognized that certain addenda generically designated as "hardener addenda" or simply "hardeners" may be incorporated into radiation-sensitive compositions and coatings to obviate at least one of the above undesirable gelatin characteristics.

In order to serve the needs of the photographic arts, it is desirable not only that a hardener ameliorate the deficiencies of gelatins as noted above, but that the hardener meet certain additional practical criteria. For example, the hardener should cause hardening or setting of the emulsion sufficiently slowly to permit coating of the photographic emulsion onto a support, but it should not set up so slowly that after-hardening takes place; i.e., the emulsion continues to harden undesirably during storage of a fabricated photographic element. Also, the hardener should possess sufficiently low levels of toxicity so as not to pose a significant hazard to manufacturing personnel. Further, the hardener should not undesirably reduce nor interfere with the desired photographic properties of the element into which it is incorporated. For example, the hardener should not contribute to the reduction of silver halide to produce fogging of a photographic emulsion or coating. These criteria for hardeners are all the more challenging when it is borne in mind that the compositions of photographic gelatins are themselves not fully understood and that the mechanisms are not entirely appreciated.

In addition to the above considerations, it must be recognized that the hardener is only a part of what typically is a comparatively complex photographic system. For example, in addition to the radiation-sensitive silver halide and the gelatin to be hardened, photographic emulsions typically contain numerous additional addenda. With so many criteria being applied to hardeners and in view of the complexity of photographic emulsions, it is not then surprising that there is presently no known way of predicting the suitability of significantly differing types of compounds as hardeners in photographic emulsions, and the art has relied upon empirical methods to discover new types of hardeners.

Divinylsulfone has been heretofore recognized as an effective gelatin hardener, but its use has been curtailed by its undesirable toxicity. Heyna, in U.S. Pat. No. 2,994,611 issued Aug. 1, 1961, discloses the use of bis(vinylsulfonyl)aryl and bis(vinylsulfonylanilide)aryl hardeners with proteins. Ryan, in U.S. Pat. No. 3,132,945 issued May 14, 1964, teaches the use of monovinylsulfonyll acyclic aliphatic gelatin ballasts to facilitate silver halide dispersion. Feldman, in U.S. Pat. No. 3,068,123 issued Dec. 11, 1962, teaches the reaction of bis(vinylsulfonyl)alkylene compounds with glycols to produce agents capable of imparting crease resistance to textiles. Welch, in U.S. Pat. No. 3,202,474 issued Aug. 24, 1965, teaches the reaction of divinylsulfone with formaldehyde in controlled proportions to produce novel crosslinked and partially esterified cellulose textiles of improved resistance to stretching and shrinking. Other compounds having bis(vinylsulfonyl) moieties joined through a divalent radical having one or more hetero atoms such as oxygen or nitrogen have been used as hardeners in photographic applications as illustrated by Burness in U.S. Pat. No. 3,539,644 issued Nov. 10, 1970.

In one aspect, the present invention is directed to a composition comprised of a hardenable hydrophilic colloid and an amount sufficient to produce hardening of a compound having two vinylsulfonyl radicals coupled through a divalent hydrocarbon radical chosen from the group consisting of (1) an aliphatic radical having from 1 to 6 carbon atoms, (2) —X—Y—X— in which X is an alkylene group having 1 or 2 carbon atoms and Y is a phenylene group, and (3) a phenyl-substituted methylene group.

In another aspect, the present invention is directed to a photographic element containing a radiation-sensitive layer of a hardenable hydrophilic colloid as set forth above.

In still another aspect, the present invention is directed to compounds having the structural formula:

$$CH_2{=}CHSO_2{-}A{-}SO_2CH{=}CH_2$$

in which A is chosen from the class consisting of (1) alkenylene in which the alkenylene group has from 2 to 6 carbon atoms; (2) —X—Y—X— in which X is an alkylene group having 1 or 2 carbon atoms and Y is a phenylene group; and (3) a phenyl-substituted methylene group.

It has been discovered quite unexpectedly that bis(vinylsulfonyl) compounds having a divalent hydrocarbon linking radical containing an aliphatic moiety, as hereinafter more specifically defined, are capable of being utilized as hardeners for hydrophilic colloids and, specifically, are useful as hardeners for radiation-sensitive hydrophilic colloid layers, such as radiation-sensitive silver halide-containing gelatin layers, utilized in photographic elements. The bis(vinylsulfonyl) compounds of this invention harden hydrophilic colloids to reduce swelling and abrasion thereof. The hardeners of the present invention are particularly useful, since they do not harden hydrophilic colloids so rapidly as to interfere with their being coated onto a support, yet they are free from undesirable afterhardening characteristics. At the same time, colloids hardened with the bis(vinylsulfonyl) compounds utilized in the practice of this invention do not pose a hazard to manufacturing personnel as compared with divinylsulfone hardener, for example. It is a particularly useful discovery that the bis(vinylsulfonyl) compounds of this invention are compatible with radiation-sensitive hardenable colloids, such as photographic emulsions.

One class of hardeners having divalent hydrocarbon linking radicals joining two vinylsulfonyl groups and containing an aliphatic linking moiety according to this invention is bis(vinylsulfonyl)alkylene hardeners.

Exemplary preferred hardeners of this class are 1,1-bis(vinylsulfonyl)methane, 1,2-bis(vinylsulfonyl)ethane, 1,1-bis(vinylsulfonyl)ethane, 2,2-bis(vinylsulfonyl)propane, 1,1-bis(vinylsulfonyl)propane, 1,3-bis(vinylsulfonyl)propane, 1,4-bis(vinylsulfonyl)butane, 1,5-bis(vinylsulfonyl)pentane, and 1,6-bis(vinylsulfonyl)hexane. It is recognized that compounds of this general class have been heretofore known to the art, as taught by Feldman, for example. However, this class of compounds has never previously been recognized to possess useful hardening properties.

In addition to the above compounds useful as hardeners according to this invention, certain novel compounds have been discovered which have useful hardening properties. One such class of novel compounds is that containing two vinylsulfonyl radicals joined by a divalent hydrocarbon linking radical which is an alkenylene having from 2 to 6 carbon atoms. Exemplary of suitable bis(vinylsulfonyl)alkenes are 1,4-bis(vinylsulfonyl)-2-butene, 1,5-bis(vinylsulfonyl)-2-pentene, 1,6-bis(vinylsulfonyl)-2-hexene and 1,6-bis(vinylsulfonyl)-3-hexene. An additional class of novel hardening compounds is that in which the two vinylsulfonyl groups are linked by a divalent hydrocarbon radical identified by the formula —X—Y—X— in which X is in each occurrence an alkylene radical having 1 or 2 carbon atoms and Y is a phenylene group. Exemplary of this class of compounds are $\alpha,\alpha'$-bis(vinylsulfonyl)xylene and bis(2-vinylsulfonylethyl)-benzene. Still another useful hardener within the contemplation of this invention is $\alpha,\alpha$-bis(vinylsulfonyl)toluene.

The compounds useful in the practice of this invention may be prepared by procedures generally known to the art, such as, for example, by the oxidation of the corresponding sulfides to sulfones as described by Schultz et al., in J. Org. Chem., 28, 1140(1963), and by other methods generally known to the art, such as those described more fully in U.S. Pat. Nos. 3,005,852 issued Oct. 24, 1961, and 3,006,962 and 3,006,963 issued Oct. 31, 1961. The compounds are preferably prepared according to the procedures set forth in the examples.

The hydrophilic colloids which are hardenable by the above bis(vinylsulfonyl) compounds can be formed from one or more hydrophilic, water-permeable, colloid-forming, natural or synthetic polymers. Specific polymers which can be hardened according to the practice of this invention include hardenable polymers such as gelatin, colloidal albumin, acid- or water-soluble vinyl polymers, cellulose derivatives, proteins, various polyacrylamides, dispersed polymerized vinyl compounds, particularly those which increase the dimensional stability of photographic materials as exemplified by amine-containing polymers of alkyl acrylates, methacrylates, acrylic acid, sulfoalkyl acrylates and methacrylates, acrylic acid-acrylate copolymers, and the like. Suitable synthetic polymers include those described, for example, in U.S. Pat. Nos. 3,142,568 by Nottorf issued July 28, 1964, 3,193,386 by White issued July 6, 1965, 3,062,674 by Houck et al., issued Nov. 6, 1962, 3,220,844 by Houck et al., issued Nov. 30, 1965, 3,287,289 by Ream et al., issued Nov. 22, 1966, 3,411,911 by Dykstra issued Nov. 19, 1968, and 3,488,708 by Smith issued Jan. 6, 1970, and Canadian Pat. No. 774,054 by Dykstra. The use of hardeners of this invention with polymers having active ketomethylene groups, as described in Smith, U.S. Pat. No. 3,488,708, cited above, is the separate invention of Osterhoudt and Smith disclosed in concurrently filed patent application U.S. Ser. No. 293,695, titled "Photographic Element Comprising a Vinylsulfonyl Crosslinked Polymer Having Active Ketomethylene Groups."

The hydrophilic colloid to be hardened is typically utilized as a layer or coating on a support. A wide variety of supports, such as polymeric film, wood, metal, glass and the like, may be utilized to form hydrophilic colloid-coated elements according to this invention. Where a photographic element is contemplated, the support can take such forms as those set forth in paragraph X of Product Licensing Index, Vol. 92, December, 1971, publication 9,232, page 108.

Where the hydrophilic colloid is to be utilized in combination with a support to form a photographic element, it will contain in or on it a radiation-sensitive material. This material can be panchromatic or orthochromatic material, sensitive only to X-rays or sensitive to selected portions of the electromagnetic spectrum. In one form of the invention, the radiation-sensitive portion of the photographic element can contain a single, unitary hydrophilic colloid layer having dispersed therein the radiation-sensitive material, together with photographic addenda to form a photographic emulsion layer or coating. In alternative forms, the radiation-sensitive portion of the photographic element can comprise a plurality of layers with the radiation-sensitive material or materials being contained in some or all of the layers. For example, as is characteristic of color photography, a plurality of layers can be present, sensitized within separate segments of the visible spectrum.

Suitable radiation-sensitive colloid compositions which can be employed in practicing this invention are sensitive to electromagnetic radiation and include such diverse materials as silver salt, zinc oxide, photosensitive polycarbonate resins and the like. Silver halides are preferred radiation-sensitive materials and are preferably associated with a colloid dispersion vehicle to form an emulsion coating or layer. Specific preferred silver halide-containing photographic emulsions and processes for their preparation and use are disclosed in paragraph I of Product Licensing Index, Vol. 92, December, 1971, publication 9,232, page 107. The radiation-sensitive colloids can additionally include a variety of conventional photographic addenda, such as development modifiers, antifoggants, plasticizers and lubricants, brighteners, spectral-sensitization agents and color-forming materials, as set forth in paragraphs IV, V, XI, XIV, XV and XXII, respectively of Product Licensing Index, Vol. 92, December, 1971, publication 9,232, pages 107–110. While it is contemplated that the compounds utilized in the practice of this invention may serve as the sole hardener present, it is appreciated that other conventional hardeners may also be incorporated into the hydrophilic colloid, such as those set forth, for example, in paragraph VII of Product Licensing Index, Vol. 92, December, 1971, publication 9,232, pages 107–108.

While a wide range of concentrations of the bis(-vinylsulfonyl) compounds described herein is effective to harden, a particularly effective concentration is from about 0.5 to about 6 percent by weight, based on the weight of the hardenable material present. This does not include the weight of water present in the colloid. In a preferred range, it has been found that about 1 percent to about 3 percent by weight, based on the weight of hardenable material, is particularly effective in achieving superior hardening.

In order to achieve uniform hardening activity, it is preferred to disperse uniformly the bis(vinylsulfonyl) compounds in the hydrophilic colloid to be modified. According to one technique, referred to as forehardening, the hardener compound is dissolved in a volatile solvent, such as a lower alkyl alcohol, acetone, etc., and the solution is uniformly blended with the hydrophilic colloid to be modified. Typically, the hydrophilic colloid has at this stage an amount of water associated therewith which is in excess of that ultimately desired. Immediately after blending, the colloid is deposited on a suitable support to form a layer or coating. The colloid is then hardened on the support and such volatile solvent and/or dispersants as are associated with the colloid and 2-haloethylsulfonyl compound solution are removed by evaporation either at ambient or elevated temperatures, typically below about 100° C.

It is also contemplated that the hardener compounds of this invention may be associated with hydrophilic colloids after they have been positioned on supports as coatings or layers. The support bearing a hydrophilic colloid coating to be hardened may be immersed in a solution containing the 2-haloethylsulfonyl compound therein so that the solution either surface-hardens the colloid layer or permeates and uniformly hardens the colloid layer. This hardening technique, referred to as prehardening, finds particular utility in hardening certain photographic elements after exposure but before processing to form the photographic image. In this way, a level of hardening can be imparted to the photographic element that might be objectionable in storage and use prior to exposure, but which is quite advantageous in preventing damage to the colloid layer of the photographic element during processing.

The following examples are included for a further understanding of the invention.

EXAMPLE 1

Bis(vinylsulfonyl)methane a. Bis(2-hydroxyethylsulfonyl)methane

Bis(2-hydroxyethylthio)methane prepared from the well-known acid-catalyzed reaction of formaldehyde and 2-mercaptoethanol produced a colorless solid of m.p. 71.5°–77° C.

b. Bis(2-chloroethylsulfonyl)methane

A solution of 22 g. of diol and 0.6 g. of N,N-dimethylformamide in 240 ml. of acetonitrile was heated to reflux and 22.9 g. of thionyl chloride were added slowly during 40 minutes. After a 3-hour reflux period, the solution was treated with charcoal and filtered, and the solvent was evaporated at 40° C. to yield a semisolid. Recrystallization from n-propanol and then 3:1 toluene-ligroine produced 7.5 g. of colorless solid; m.p. 108°–109.5° C.

c. Bis(vinysulfonyl)methane

To a solution of 24.2 g. of the dichloride in 200 ml. of dry ethyl acetate containing 0.2 g. of hydroquinone was added at 0°–5° C. a solution of 18.2 g. of triethylamine in 30 ml. of ethyl acetate. After several hours the mixture was filtered and the filtrate concentrated at 25° C. to give 67 g. of a nearly colorless 25 percent solution of bis(vinylsulfonyl)methane.

EXAMPLE 2

1,3-Bis(vinylsulfonyl)propane a. 1,3-Bis(2-hydroxyethylthio)propane

The sodium mercaptide of 2-mercaptoethanol was made by reacting 1 mole each of sodium methoxide and 2-mercaptoethanol in dry methanol under a nitrogen atmosphere. To this solution, 0.5 mole of 1,3-dichloropropane was added and the mixture was refluxed for 1 hour and filtered. The methanol filtrate was evaporated on a flash evaporator and traces of 2-mercaptoethanol were distilled off at high vacuum at room temperature. The yellow, oily residue was extracted with acetone, the solution filtered, and the acetone evaporated to give a 95 percent yield of the crude product.

b. 1,3-Bis(2-hydroxyethylsulfonyl)propane

Schultz, Freyermuth and Buc's method as described in J. Org. Chem., 28, 1140 (1963), for the oxidation of sulfides to sulfones was used. A mixture of 0.56 mole of 1,3-bis(2-hydroxyethylthio)propane and tungstic acid (0.6 g.) catalyst solution was warmed to 63° C. and 2.04 moles of 30 percent hydrogen peroxide were added dropwise, keeping the temperature at 63°–70° C. After addition was completed, the solution was cooled to room temperature. The white solid formed was collected and recrystallized from hot water; yield 71.4 g. (49 percent); m.p. 158°–161° C.

c. 1,3-Bis(2-chloroethylsulfonyl)propane 1,3-Bis(2-hydroxyethylsulfonyl)propane (71.4 g., 0.274 mole) was suspended in 900 ml. of dry ethyl acetate and 2 ml. of N,N-dimethylformamide. The mixture was heated to reflux and 71.8 g. (0.603 mole) of thionyl chloride were dropped in within 1.5 hours and the mixture was refluxed for another 4.5 hours. The cooled reaction mixture was filtered and the resulting solid was washed successively with ethyl acetate and ethanol and then digested in hot alcohol for 1 hour. There were obtained 74.5 g. (90.2 percent) of 1,3-bis(2-chloroethylsulfonyl)propane; m.p. 142°–146° C.

d. 1,3-Bis(vinylsulfonyl)propane 1,3-Bis(2-chloroethylsulfonyl)propane (74.5 g., 0.249 mole) was suspended in 2,300 ml. of ethyl acetate containing 0.12 g. hydroquinone. Triethylamine (50.7 g., 0.50 mole) was dropped in with stirring, within 10 minutes at 25° C. The resulting mixture was stirred at 25° C. for 20 hours. The amine salt was filtered off and the ethyl acetate solution evaporated at 30° C. The tan-colored solid was washed with water, then recrystallized from ethanol; yield 32.8 g. (59 percent); m.p. 60°–63° C.

Anal. Calc'd, for $C_7H_{12}O_4S_2$: C, 37.5; H, 5.4; S, 28.5
Found: C, 37.6; H, 5.0; S, 28.5

EXAMPLE 3

1,2-Bis(vinylsulfonyl)ethane

A method similar to that of Example 2 was utilized except that 1,2-dichloroethane was substituted for 1,3-dichloropropane. The yield was 76 percent upon recrystallization from ethanol. The melting point of the product was 122°-5° C.

Anal. Calc'd for $C_6H_{10}O_4S_2$: C, 34.3; H, 4.8; S, 30.5
Found: C, 34.7; H, 4.9; S, 30.9

EXAMPLE 4

1,4-Bis(vinylsulfonyl)butane

A method similar to that of Example 2 was utilized except that 1,4-dichlorobutane was substituted for 1,3-dichloropropane. The yield was 87.2 percent upon recrystallization from ethanol. The melting point of the product is 96°-102° C.

Anal. Calc'd. for $C_8H_{14}O_4S_2$: C, 40.3; H, 5.9; S, 26.9
Found: C, 40.2; H, 5.8; S, 26.9

EXAMPLE 5

1,5-Bis(vinylsulfonyl)pentane

A method similar to that of Example 2 was utilized except that 1,5-dichloropentane was substituted for 1,3-dichloropropane. The yield was 27.4 percent upon recrystallization from ethanol. The melting point of the product was 49°-52° C. The nmr spectrum confirmed the structure.

EXAMPLE 6

2,2-Bis(vinylsulfonyl)propane

This compound was prepared from 2,2-bis(2-chloroethylsulfonyl)propane as described by J. Buchi et al., in Helv. Chim. Acta, 42, 1368 (1959), by the procedure of Example V(c). Removal of the solvent and recrystallization from ether-ethanol produced pure, colorless needles; m.p. 121°-122.5° C. (Buchi et al., report m.p. 123° C.)

EXAMPLE 7

1,1-Bis(vinylsulfonyl)ethane

This hardening compound was prepared from 1,1-bis(2-chloroethylsulfonyl)ethane as in Example 2 but with a reaction time of 3.5 hours. The product, after evaporation of the solvent, was noncrystalline. The infrared and nmr spectra were compatible with the expected compound.

EXAMPLE 8 trans-1,4-Bis(vinylsulfonyl)butene

This compound was prepared from 1,4-bis(2-chloroethylsulfonyl)-2-butene by the method of Example 2-d. It consisted of needlelike crystals having a m.p. 120°-125° C.

Anal. Calc'd. for $C_8H_{12}O_4S_2$: C, 40.6; H, 5.1; S, 27.1
Found: C, 40.9; H, 5.3; S, 27.5

EXAMPLE 9

α,α'-Bis(vinylsulfonyl)-p-xylene

A suspension consisting of 21.2 g. of α,α'-bis(2-chloroethylsulfonyl)-p-xylene (prepared from p-xylylene dichloride as in Example 1), 25 ml. of triethylamine, 0.05 g. of hydroquinone and 400 ml. of ethyl acetate-N,N-dimethylformamide (1:1 v./v.) were stirred at 25° C. for 20 hours and filtered. The filtrate was evaporated to 150 ml. volume, poured into water and the white solid isolated and recrystallized from methanol and ethyl acetate; m.p. 207°-212° C.

Anal. Calc'd. for $C_{12}H_{14}O_4S_2$: C, 50.3; H, 4.9
Found: C, 50.6; H, 5.1

EXAMPLE 10

α,α-Bis(vinylsulfonyl)toluene

This compound was prepared from α,α-bis(2-chloroethylsulfonyl)toluene which is prepared as follows:

α,α-Bis(2-chloroethylthio)toluene was first obtained from a solution of 10.5 g. of benzaldehyde and 19.2 g. of 2-chloroethanethiol in ether which was saturated with hydrogen chloride at a reaction temperature of −10° to −15° C. After 18 hours at 6° C., the ether was evaporated and replaced with benzene. The solution was cooled, filtered, neutralized with aqueous sodium bicarbonate and evaporated to give a colorless intermediate product. The nmr spectrum conformed to the expected structure.

α,α-Bis(vinylsulfonyl)toluene was next obtained when oxidation of the first-formed product was effected with m-chloroperbenzoic acid. The reaction temperature was held at 25°-30° C. for 4.5 hours after the addition. After filtration of the cold (−5° C.) reaction mixture, the chloroform solution was evaporated at 40° C. to dryness. After recrystallization from benzene and then methanol, a colorless solid was obtained having a melting point of from 97°-99° C.

Anal. Calc'd. for $C_{11}H_{12}O_4S_2$; C, 48.5; H, 4.4; S, 23.5
Found: C, 48.8; H, 4.6; S, 23.4

EXAMPLE 11

Portions of the compounds prepared in the preceding examples were added to separate portions of high-speed silver bromoiodide emulsion which was panchromatically sensitized with a cyanine dye. These portions are set forth as percent-by-weight based on the weight of dry gelatin (i.e., without including water in the weight). Each emulsion sample was coated on a cellulose acetate film support at a coverage of 459 mg. of silver and 1,040 mg. of gelatin/ft.$^2$ and dried.

A sample of each film coating was tested for hardness, after a 3-day incubation at 28° C. and 50 percent relative humidity, by immersing in water at 25° C. for 3 minutes and then calculating the percentage of swell of the emulsion after measuring the thickness of the swollen samples.

The results of these hardness tests are presented in Table 1. It can be seen that in each instance the hardener significantly reduced the amount of swelling of the gelatin. With only 1 percent hardener present, the swell was in all cases reduced to less than 60 percent of its original value. With 3 percent hardener the swell was in all cases less than 40 percent, and with 6 percent hardener the swell was 35 percent or less.

Table 1

| | | Sample Swell | | | Percentage Swell | | |
|---|---|---|---|---|---|---|---|
| Example | Control Swell | 1%* | 3%* | 6%* | 1%* | 3%* | 6%* |
| 1 | 750 | 360 | 250 | 210 | 48 | 33 | 28 |
| 2 | 710 | 400 | 200 | 210 | 57 | 28 | 30 |
| 3 | 700 | 330 | 210 | 190 | 47 | 30 | 27 |
| 4 | 720 | 350 | 270 | 230 | 49 | 37 | 32 |
| 5 | 720 | 410 | 280 | 250 | 57 | 39 | 35 |
| 6 | 810 | 370 | 260 | 240 | 46 | 32 | 30 |
| 7 | 830 | 400 | 290 | 230 | 48 | 35 | 28 |
| 8 | 800 | 320 | 230 | 210 | 40 | 29 | 26 |
| 9 | 890 | 390 | ** | ** | 44 | ** | ** |
| 10 | 810 | 440 | 280 | 280 | 54 | 35 | 35 |
| 12 | 690 | 340 | 250 | 210 | 49 | 36 | 30 |
| 13 | 690 | 360 | 260 | 200 | 52 | 38 | 29 |

Table 1-continued

| Example | Control Swell | Sample Swell 1%* | 3%* | 6%* | Percentage Swell 1%* | 3%* | 6%* |
|---|---|---|---|---|---|---|---|
| 14 | 660 | 530 | 410 | 340 | 80 | 62 | 51.5 |
| 15 | 680 | 440 | ** | 310 | 65 | ** | 46 |
| 16 | 750 | 450 | 350 | ** | 60 | 47 | ** |

*percentage of hardener based on weight percentage of dry gelatin (excluding water)
**not run

EXAMPLES 12–16

Comparative Testing

For purposes of comparison, five hardeners heretofore known to the art were tested directly against the hardeners useful in the practice of this invention, using the hardening testing procedures of Example 11. The five hardeners are as follows:

| Example | Prior-Art Hardener |
|---|---|
| 12 | bis(2-vinylsulfonylethyl)ether |
| 13 | bis(2-vinylsulfonylmethyl)ether |
| 14 | N,N'-bis(2-vinylsulfonylethyl)piperazine-bis(methoperchlorate) |
| 15 | divinylsulfone |
| 16 | 4,6-dimethyl-1.3-divinylsulfonyl benzene |

The results of testing the conventional hardeners are set forth in Table 1 also. Whereas hardeners according to this invention are in all instances capable of reducing swelling to less than 60 percent of that of the unhardened gelatin when present in concentrations of only 1 percent, it can be seen that, except for the conventional bis(vinylsulfonylalkyl)ether hardeners, none of the conventional hardeners was capable of reducing swell to below 60 percent at concentrations of 1 percent. Similar comparative hardening characteristics were noted at higher concentrations. It is particularly to be noted that the bis(vinylsulfonyl)alkene hardener of Example 8 was more effective as a hardener than any of the conventional hardeners in comparable concentration ranges. It is also to be noted that the bis(vinylsulfonyl)alkylbenzene hardener of Example 9 and the $\alpha,\alpha$-bis(vinylsulfonyl)toluene hardener of Example 10 were significantly more effective than the bis(vinylsulfonyl)-benzene hardener of Example 16

EXAMPLE 17

A comparison of the hardening efficiency of one of the representative hardeners of this invention, 1,3-bis(-vinylsulfonyl)propane (Example 2), with that of two of the most active compounds of the prior art, divinylsulfone (Example 15) and bis(vinylsulfonylmethyl)ether (Example 13). Gelatin coatings were prepared, each containing one of the noted hardeners, sol-dried, and aged 1 day under ambient conditions. After 24 hours at 50 percent R.H., the samples were sealed in bags and incubated at 49° C. for 72 hours. The films were then immersed in a 40° C. water bath and allowed to swell. An Instron Tensile Tester was used to measure the tensile strength of the films. Utilizing the theory of rubber-like elasticity and the tensile strength, it was possible to calculate the number of cross-links per gram of dry gelatin. The maximum number of cross-links that could be present was calculated knowing the concentration of hardener added to the film and determining the reaction sites within the gelatin utilizing a Beckman Amino Acid Analyzer. The results obtained are set forth below in Table 2.

Table 2

| Compound by Example No. | Hardener Concentration (based on weight of dry gelatin) | Crosslinking Efficiency |
|---|---|---|
| 2 | 3.74% | 99% |
| 15 | 3.88% | 38% |
| 13 | 3.75% | 68% |

EXAMPLE 18

The hydrolytic stability of the crosslinks formed with 1,3-bis(vinylsulfonyl)propane (Example 2) was compared with that of other hardeners, e.g., dialdehydes and bisaziridines. Samples of both sol-dried and gel-dried films were examined over the range of 10°–90° C. in an Instron Tensile Tester, as noted in the preceding example. Results showed that the crosslinks formed with the compound of Example 2 were the most stable and the films had a higher tensile strength than those containing other hardeners.

The invention has been described in detail with particular reference to preferred embodiments thereof, but it will be understood that variation and modifications can be effected within the spirit and scope of the invention.

What is claimed is:

1. A photographic element comprising a support and at least one radiation-sensitive hydrophilic colloid layer containing silver halide and at least one hydrophilic colloid layer hardened with a compound having two vinylsulfonyl radicals coupled through a divalent hydrocarbon radical chosen from the group consisting of:

a. [ an unsubstituted alkyl or ] an unsubstituted alkylene radical having from 1 to 6 carbon atoms, b. —X—Y—X— in which X is an unsubstituted alkylene group having 1 or 2 carbon atoms and Y is an unsubstituted phenylene group, and c. phenyl-substituted methylene.

2. A photographic element according to claim 1 in which said layer contains from 0.5 to 6 percent by weight of said hardener based on the weight of hardenable colloid present in said layer.

3. A photographic element according to claim 1 in which said layer contains from 1 to 3 percent by weight of said hardener based on the weight of hardenable colloid present in said layer.

4. A photographic element according to claim 1 in which said layer contains gelatin.

5. A photographic element according to claim 1 in which X is an unsubstituted methylene.

6. A photographic element according to claim 1 in which said hydrophilic colloid is hardened with 1,3-bis(vinylsulfonyl)propane.

7. A photographic element according to claim 1 in which said hydrocarbon radical is an unsubstituted alkylene radical.

8. A photographic element comprising a support and at least one radiation-sensitive silver halide-containing gelatin layer hardened with a compound having the structural formula:

$$CH_2{=}CHSO_2{-}A{-}SO_2CH{=}CH_2$$

in which A is chosen from the group consisting of a. [ an unsubstituted alkyl or ] an unsubstituted alkylene radical having from 1 to 6 carbon atoms;

b. —X—Y—X— in which X is an unsubstituted alkylene group having 1 or 2 arbon atoms and Y is an unsubstituted phenylene group; and c. phenyl-substituted methylene.

*9. A photographic element comprising a support and at least one radiation-sensitive hydrophilic colloid layer containing silver halide and at least one hydrophilic colloid layer hardened with a compound having two vinylsulfonyl radicals coupled through a divalent hydrocarbon radical chosen from the group consisting of:*

*a. an unsubstituted alkenylene having from 2 to 6 carbon atoms or an unsubstituted alkylene radical having from 1 to 6 carbon atoms,*

*b. —X—Y—X— in which X is an unsubstituted alkylene group having 1 or 2 carbon atoms and Y is an unsubstituted phenylene group, and*

*c. phenyl-substituted methylene.*

*10. A photographic element comprising a support and at least one radiation-sensitive silver halide-containing gelatin layer hardened with a compound having the structural formula:*

$$CH_2{=}CHSO_2{-}A{-}SO_2CH{=}CH_2$$

*in which A is chosen from the group consisting of*

*a. an unsubstituted alkenylene having from 2 to 6 carbon atoms or an unsubstituted alkylene radical having from 1 to 6 carbon atoms;*

*b. —X—Y—X— in which X is an unsubstituted alkylene group having 1 or 2 carbon atoms and Y is an unsubstituted phenylene group; and*

*c. phenyl-substituted methylene.*

*11. A photographic element according to claim 9 in which said hydrocarbon radical is an unsubstituted alkenylene radical having from 2 to 6 carbon atoms.*

* * * * *